United States Patent [19]

Young et al.

[11] Patent Number: 4,561,531
[45] Date of Patent: Dec. 31, 1985

[54] HYDRAULIC SLAVE CYLINDER WITH LATCH MEANS FOR USE WITH CLUTCH RELEASE BEARING

[75] Inventors: Alastair J. Young, Kenilworth; David R. Arrowsmith, Leamington Spa; David Parsons, Kenilworth, all of England

[73] Assignee: Automotive Products plc, Leamington Spa, England

[21] Appl. No.: 449,515

[22] Filed: Dec. 13, 1982

[30] Foreign Application Priority Data

Dec. 15, 1981 [GB] United Kingdom ............... 8137793

[51] Int. Cl.$^4$ .................... F16D 25/08; F16D 13/44
[52] U.S. Cl. .................. 192/85 CA; 92/109; 192/91 A; 192/109 R
[58] Field of Search .............. 192/85 CA, 88 A, 89 B, 192/91 A, 98, 109 R, 110 B; 91/468; 92/107, 108, 109, 165 R, 167; 403/31, 34, 38, 289

[56] References Cited

U.S. PATENT DOCUMENTS

| 2,327,951 | 8/1943 | Zaleske | 403/289 |
|---|---|---|---|
| 2,717,680 | 9/1955 | Smith | 192/91 A |
| 2,757,769 | 8/1956 | Roise | 192/109 R |
| 3,955,660 | 5/1976 | Poon et al. | 192/91 A |
| 4,051,937 | 10/1977 | Garrett et al. | 192/85 CA |
| 4,069,904 | 1/1978 | Garrett et al. | 192/85 CA |
| 4,328,883 | 5/1982 | Shellhause | 192/85 CA |

FOREIGN PATENT DOCUMENTS

| 0669182 | 8/1963 | Canada | 192/91 A |
|---|---|---|---|
| 0599807 | 3/1948 | United Kingdom . | |
| 1027925 | 4/1966 | United Kingdom . | |
| 1231290 | 5/1971 | United Kingdom . | |
| 1255003 | 11/1971 | United Kingdom | 192/98 |
| 1365393 | 9/1974 | United Kingdom . | |
| 1373479 | 11/1974 | United Kingdom . | |
| 1401596 | 7/1975 | United Kingdom . | |
| 1478980 | 7/1977 | United Kingdom . | |
| 2006377A | 5/1979 | United Kingdom . | |

*Primary Examiner*—Rodney H. Bonck
*Attorney, Agent, or Firm*—Kemon & Estabrook

[57] ABSTRACT

Concentric piston and cylinder components of a hydraulic slave cylinder used with a clutch release bearing have their axial movement under a biassing spring limited by latch means in the form of flanges. The flanges each have a radial face and a chamfered face, and one flange is radially deformable, being on a slotted cylindrical extension. The radially deformable flange allows the cylinder to be rapidly assembled without the need for assembly of a separate retaining device.

5 Claims, 1 Drawing Figure

U.S. Patent     Dec. 31, 1985     4,561,531
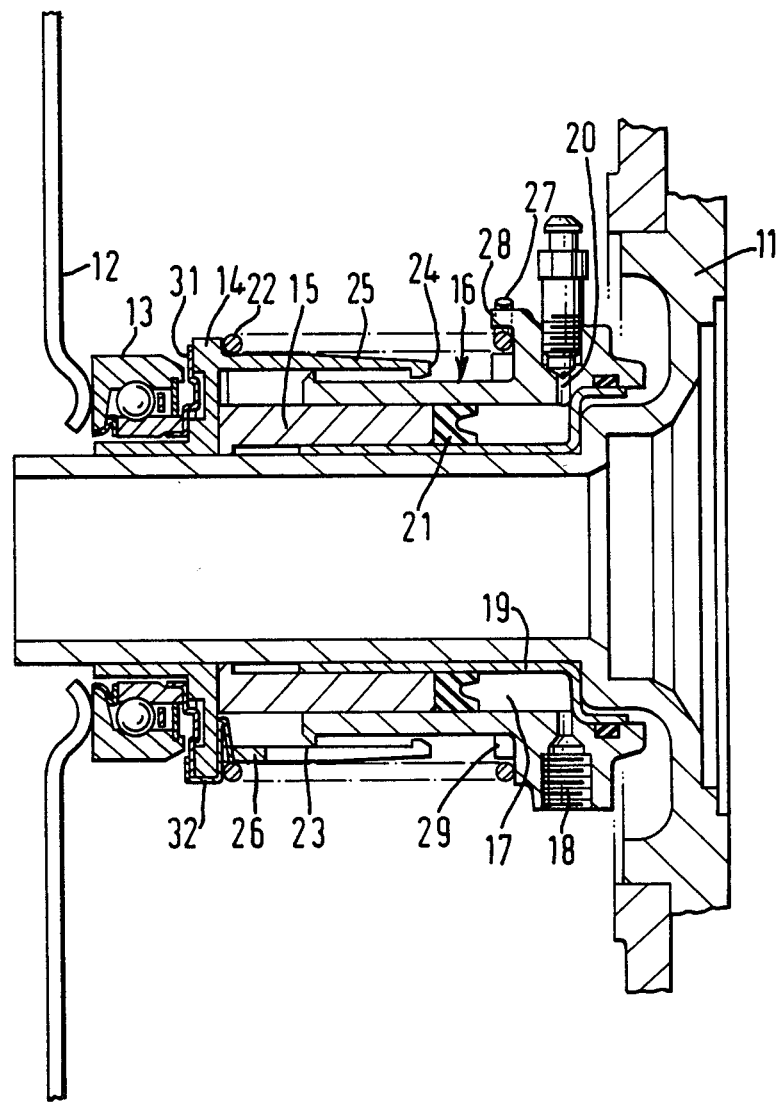

HYDRAULIC SLAVE CYLINDER WITH LATCH MEANS FOR USE WITH CLUTCH RELEASE BEARING

The invention relates to hydraulic slave cylinder devices of the kind which comprises concentric annular piston and cylinder components which define walls of an annular chamber for receiving hydraulic pressure to move one of said components axially relative to the other, such a slave cylinder being for clutch actuation.

One example of a hydraulic slave cylinder of the kind described is shown in GB. No. 1 027 925. This specification describes how a clutch release bearing carried by the slave cylinder is lightly loaded against a clutch by hydrostatic pressure. However, it is usual practice to provide a spring to lightly load the bearing onto the clutch, as shown in GB. No. 1 373 479 for example.

When a hydraulic slave cylinder of the kind described incorporates a spring which biasses the piston and cylinder components in the same direction as movement induced by hydraulic pressure, it is necessary to incorporate some form of restraining device to keep the components correctly assembled before the clutch and the release bearing and slave cylinder assembly are brought together.

It is an object of the invention to provide a hydraulic slave cylinder of the kind described which incorporates a restraining device which does not inhibit rapid assembly of the piston and cylinder components.

The present invention provides a hydraulic slave cylinder for use with a clutch release bearing and comprising concentric annular piston and cylinder components which define walls of an annular chamber for receiving hydraulic pressure to move one of said components axially relative to the other, spring means acting between respective abutment members carried by said components for biassing said abutment members axially apart in the same direction as movement induced by the hydraulic pressure, and latch means on the abutment members for limiting relative axial movement of the abutment members in the direction induced by the hydraulic pressure whilst allowing relative axial movement of the abutment members in the opposite direction during assembly of the hydraulic slave cylinder.

One embodiment of the invention will now be described with reference to the accompanying drawing which shows a hydraulic slave cylinder according to the invention.

In the drawing there is shown a tubular extension or trumpet 11 which is a gearbox component which normally surrounds the gearbox input shaft. A diaphragm spring clutch (not shown) has diaphragm fingers 12 which are deflected to the left of the drawing, i.e. away from the gearbox, for clutch release. A release bearing 13 abuts the fingers 12 and is supported by a flanged collar 14 in a manner which provides controlled radial movement of the bearing as described in GB. No. 2 006 377A. The collar 14 is axially slidable on the trumpet 11 and is arranged for abutment with an annular piston component 15. With a cylinder component 16, the piston component 15 defines walls of an annular chamber 17 which can receive hydraulic pressure through an inlet portion 18 positioned similarly to a bleed port 20.

The annular chamber 17 is also bounded by a pressed liner 19 which has a radial flange for abutment with the trumpet 11 and an axial rim which is spigotted into the cylinder component 16, sealed with an 'O' ring and retained by peening. A double-lip seal 21 is provided for the piston component 15.

In order to maintain a light preload of the release bearing 13 on the diaphragm spring fingers 12, spring means in the form of a helical compression spring 22 acts between a first spring abutment member provided by the outer portion of the flange of collar 14 and a second spring abutment member provided by a similar flange portion of cylinder component 16. Thus the spring 22 acts to bias the abutment members in the direction induced by hydraulic pressure in the annular chamber 17.

In order to limit axial movement of the collar 14 relative to the cylinder component 16, particularly for use when the gearbox and clutch are separated, latch means are provided in the form of a flange 23 which extends radially outwardly from the cylinder component 16 and a radially deformable flange 24 extending radially inwardly from a cylindrical extension 25 which projects axially from the collar 14 and is tapered towards the flange 24. Flanges 23 and 24 each have one radial face and one chamfered face. The cylindrical extension 25 and flange 24 are slotted axially to form fingers which are resilient by virtue of their cross-section and the characteristics of the material of the collar 14.

In the example shown, the material is preferably glass-filled nylon. The chamfers allow the flanges 23 and 24 to slide one over the other during assembly, the flange 24 on the extension 25 being temporarily deflected radially outwards. After assembly of the cylinder, the radial faces abut to resist the load of the spring 22.

The radially deformable flange 24 obviates a need for assembling a separate retaining device such as a collar retained by peening or a circlip or snap ring.

The spring 22 provides resistance against rotation of the collar 14 relative to the cylinder component 16 in the normal direction of rotation of the clutch, for example if the bearing 13 is unduly stiff. The collar 14 includes a tubular spigot section 26 which forms the base of the fingers 25 and the spring is a close diametral fit on the spigot section such that any tendency towards rotation is resisted by an increase in the radial force exerted by the spring. Thus the helix of the spring 22 is arranged so that it tends to tighten onto the spigot section 26. The spring 22 is provided at its other end with a tab 27 which engages a lug 28 formed integrally with the cylinder component 16 and which resists rotation of the spring. Buttress portions 29 on the cylinder component 16 provide radial location for the spring 22. Alternatively an array of lugs 28 may be provided.

The release bearing 13 is spigotted onto a pressed annular flange 31. This is retained by a viscous adhesive as described in GB. 2 006 377 A and additionally by spring clips 32 which include folded-over tab sections which extend into slots in the spigot section 26 and are retained by the end coil of spring 22.

We claim:
1. A hydraulic slave cylinder for use with a clutch release bearing, the slave cylinder comprising:
   a cylinder component;
   an annular piston component concentric with the cylinder components and axially slidable relative thereto;
   an annular chamber having walls defined by the cylinder component and the piston component;

an inlet port in one of said components for connecting the annular chamber to a source of hydraulic pressure, said pressure acting to move the piston and cylinder components in a direction for clutch release;

first and second spring abutment members carried by said piston and cylinder components respectively;

spring means acting between said abutment members for biassing the abutment members apart in the same direction as movement induced by hydraulic pressure in the annular chamber;

and latch means integral with said abutment members which limits relative axial movement of the abutment in the assembled slave cylinder but allows the abutment members to slide over one another during assembly of the hydraulic slave cylinder, by temporary deflection of part of said latch means during said assembly, said latch means preventing disassembly of the slave cylinder by limiting said relative axial movement of the piston and cylinder components in said direction for clutch release after assembly of the hydraulic slave cylinder.

2. The slave cylinder of claim 1, wherein said latch means comprises a flange on each of said abutment members, the flanges extending in opposite radial directions and one of the flanges being radially deformable.

3. The slave cylinder of claim 2, wherein said one flange is provided on a cylindrical extension of the respective abutment member, said one flange and the cylindrical extension being slotted axially to form resilient fingers.

4. The slave cylinder of claim 2, wherein each flange has a radial face and a chamfered face, the chamfered faces abutting during assembly of the cylinder and the radial faces abutting after assembly to resist the load of the spring means.

5. The slave cylinder of claim 3, wherein each flange has a radial face and a chamfered face, the chamfered faces abutting during assembly of the cylinder and the radial faces abutting after assembly to resist the load of the spring means.

* * * * *